(12) United States Patent
Westover et al.

(10) Patent No.: US 9,969,553 B2
(45) Date of Patent: May 15, 2018

(54) HOPPER APPARATUSES FOR PROCESSING A BULK SOLID, AND RELATED SYSTEMS AND METHODS

(71) Applicant: Battelle Energy Alliance, LLC, Idaho Falls, ID (US)

(72) Inventors: Tyler Lott Westover, Idaho Falls, ID (US); John Chadron Benjamin Ryan, Rexburg, ID (US); Austin Colter Matthews, Salt Lake City, UT (US); Sergio Hernandez, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 72 days.

(21) Appl. No.: 15/235,895

(22) Filed: Aug. 12, 2016

(65) Prior Publication Data

US 2018/0044113 A1    Feb. 15, 2018

(51) Int. Cl.
*B65G 11/16* (2006.01)
*B65G 11/02* (2006.01)
(Continued)

(52) U.S. Cl.
CPC .......... *B65G 11/166* (2013.01); *B65G 11/026* (2013.01); *B65G 11/186* (2013.01);
(Continued)

(58) Field of Classification Search
CPC .... G01G 13/00; G01G 13/003; G01G 13/006; G01G 13/024; B65G 51/16; B65G 43/08;
(Continued)

(56) References Cited

U.S. PATENT DOCUMENTS 2,637,434 A * 5/1953 Harper ................ G01G 11/083
177/121
3,583,221 A    6/1971 Ehrenfried et al.
(Continued)

OTHER PUBLICATIONS

Westover et al., "Characterization of Genera Switch Grass Samples 8, 10, 2 and 11", INL/Ext-13-30126 (Sep. 2013), 27 pages.
(Continued)

*Primary Examiner* — Nicholas J Weiss
*Assistant Examiner* — Andrew P Bainbridge
(74) *Attorney, Agent, or Firm* — TraskBritt

(57) ABSTRACT

A hopper apparatus comprises a movable wall comprising opposing walls movably connected to a support assembly and oriented at acute angles relative to a central vertical axis of the support assembly, and movement control devices configured and positioned to move the opposing walls along the support assembly to control dimensions of a discharge outlet at least partially defined by converging ends of the opposing walls; a liner assembly comprising liner structures at least partially overlying inner surfaces of the opposing walls and configured to remain at least partially stationary relative to the opposing walls during movement of the opposing walls; and pressure sensors between the inner surfaces of opposing walls and portions of the liner structures thereover. A bulk solids processing system and a method of processing a bulk solid are also described.

25 Claims, 6 Drawing Sheets

(51) Int. Cl.
 *B65G 11/18* (2006.01)
 *B65G 11/20* (2006.01)
 *B65G 43/08* (2006.01)
 *B65G 47/19* (2006.01)
 *G01G 13/02* (2006.01)

(52) U.S. Cl.
 CPC .............. *B65G 11/20* (2013.01); *B65G 43/08* (2013.01); *B65G 47/19* (2013.01); *B65G 2201/04* (2013.01); *B65G 2203/042* (2013.01); *G01G 13/024* (2013.01)

(58) Field of Classification Search
 CPC ......... B65G 47/16; B65G 47/18–47/20; B65G 2203/042; B65G 2201/04; B65G 11/026; B65G 11/20; B65G 11/166; B65G 11/186; B65G 11/206
 USPC ................ 406/27; 177/23.18, 260, 105, 116; 222/63–64, 77, 333, 504, 526–537, 222/282–283, 544–545, 559
 See application file for complete search history.

(56) References Cited

U.S. PATENT DOCUMENTS

| | | | | |
|---|---|---|---|---|
| 3,901,419 | A | | 8/1975 | Szendroi |
| 4,282,988 | A | | 8/1981 | Hulbert, Jr. |
| 4,828,448 | A | * | 5/1989 | Skeath .................. B65D 90/587 198/532 |
| 4,881,862 | A | | 11/1989 | Dick |
| 4,944,428 | A | * | 7/1990 | Gmur .................... G01G 11/003 177/50 |
| 5,127,483 | A | * | 7/1992 | Hough .................. G01G 13/026 177/105 |
| 5,322,195 | A | * | 6/1994 | Ellis ...................... B65D 90/205 222/105 |
| 5,697,523 | A | * | 12/1997 | Brandauer .............. B65D 90/56 141/248 |
| 5,769,281 | A | | 6/1998 | Bates |
| 5,992,689 | A | * | 11/1999 | Johanson ........... B65G 47/5195 222/503 |
| 7,137,759 | B1 | | 11/2006 | Ambs |
| 7,312,408 | B2 | * | 12/2007 | Kawanishi ........... G01G 19/393 177/105 |
| 8,087,851 | B1 | | 1/2012 | Jarvis et al. |
| 8,299,374 | B2 | * | 10/2012 | Brandt ................. G01G 11/003 177/1 |
| 8,387,824 | B2 | | 3/2013 | Wietgrefe |
| 8,523,496 | B2 | | 9/2013 | Bartek |
| 8,607,964 | B2 | * | 12/2013 | Kheifets ................ B65G 43/08 193/21 |

OTHER PUBLICATIONS

Westover et al., "Comprehensive rheological characterization of chopped and ground switchgrass", Biofuels (Sep. 2015), 12 pages.
Westover et al., "Flowability Performance of Pine Chips as a Function of Particle Size & Moisture Content", 2015 AIChE Annual Meeting, 573a (Nov. 2015), 29 pages.

* cited by examiner

HOPPER APPARATUSES FOR PROCESSING A BULK SOLID, AND RELATED SYSTEMS AND METHODS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates generally to hopper apparatuses for processing a bulk solid, and to related systems and methods. More specifically, embodiments of the disclosure relate to hopper apparatuses for characterizing the flowability of and substantially continuously flowing one or more bulk solids, and to related systems and methods.

BACKGROUND

Efficient and reliable flow of bulk solids is of significant importance to a wide range of industries (e.g., energy industries, milling industries, agricultural industries, food production and/or processing industries, waste management industries, pharmaceutical industries, etc.). As used herein, the term "bulk solid" refers to a flowable material formed of and including a plurality of at least partially (e.g., substantially) solid structures (e.g., particles, granules, grains, fibers, pellets, chips, etc.). Non-limiting examples of bulk solids include lignocellulosic biomass such as bagasse (e.g., sugar cane bagasse), grasses (e.g., switch grass), stover (e.g., corn stover), straw, wood chips, etc.; algae; seeds; coal; limestone; cement; clay; municipal waste; dry distillers grain; flour; milk powder; plastic powders; pharmaceutical powders; and other particulate, fibrous, and/or granular materials.

Unfortunately, the rheological properties (e.g., bulk density, particle size distribution, particle shape distribution, microstructure, compressibility, elastic recovery, shear strength, equipment wall friction, equilibrium moisture content, etc.) of many bulk solids and/or environmental conditions (e.g., relative humidity, temperature, equipment vibrations, etc.) can create problems for accurately accessing and controlling the flow of the bulk solids as required for various processes. For example, the rheological properties of some types of bulk solids can result in the formation of bridges, crusts, and/or funnels of the bulk solids at bottom discharge openings of hoppers that can impede, prevent, or otherwise render erratic the flow of the bulk solids from the hoppers. Such problems can undesirably result in product deterioration, process downtime (e.g., for associated equipment cleaning), and/or process equipment damage. In addition, such problems can be exacerbated in processes handling multiple types and/or lots of bulk solids wherein flow rates and/or equipment characteristics (e.g., wall material compositions, discharge opening diameters, etc.) suitable for continuously and uniformly flowing one type and/or lot of bulk solid may not be suitable another type and/or lot of bulk solid.

It would, therefore, be desirable to have new apparatuses systems, and methods for processing bulk solids that are easy to employ, cost-effective, and more versatile as compared to conventional methods, systems, and apparatuses for processing bulk solids. It would also be desirable if such methods, systems, and apparatuses could characterize the flowability of a bulk solid and automatically adjust processing parameters (e.g., flow rates, discharge opening diameters, etc.) to facilitate a substantially uniform, continuous flow of the bulk solid.

BRIEF SUMMARY

Embodiments described herein include apparatuses, systems, and methods for processing bulk solids. In accordance with one embodiment described herein, a hopper apparatus comprises a movable wall assembly comprising opposing walls movably connected to a support assembly and oriented at acute angles relative to a central vertical axis of the support assembly, and movement control devices configured and positioned to move the opposing walls along the support assembly to control dimensions of a discharge outlet at least partially defined by converging ends of the opposing walls; a liner assembly comprising liner structures at least partially overlying inner surfaces of the opposing walls and configured to remain at least partially stationary relative to the opposing walls during movement of the opposing walls; and pressure sensors between the inner surfaces of opposing walls and portions of the liner structures thereover.

In additional embodiments, a bulk solids processing system comprises a source of at least one bulk solid, a hopper apparatus configured and positioned to receive the at least one bulk solid from the source, a computer assembly operatively associated with and configured to receive measurement data from the hopper apparatus, and control logic in communication with the computer assembly and configured to verify the operability of and control the hopper apparatus and to characterize the flowability of the at least one bulk solid at least partially based on the measurement data received by the computer assembly. The hopper apparatus comprises a movable wall assembly comprising opposing walls movably connected to a support assembly and oriented at acute angles relative to a central vertical axis of the support assembly, and movement control devices configured and positioned to move the opposing walls along the support assembly to control dimensions of a discharge outlet at least partially defined by converging ends of the opposing walls; a liner assembly comprising liner structures at least partially overlying inner surfaces of the opposing walls and configured to remain at least partially stationary relative to the opposing walls during movement of the opposing walls; and pressure sensors between the inner surfaces of opposing walls and portions of the liner structures thereover.

In further embodiments, a method of processing a bulk solid comprises determining flowability characteristics of at least one bulk solid using a bulk solids processing system comprising a hopper apparatus operatively associated with a bulk solid source, a computer assembly operatively associated with and configured to receive measurement data from the hopper apparatus, and control logic in communication with the computer assembly and configured to verify the operability of and control the hopper apparatus and to characterize the flowability of the at least one bulk solid at least partially based on the measurement data received by the computer assembly. The hopper apparatus comprises a movable wall assembly comprising opposing walls movably connected to a support assembly and oriented at acute angles relative to a central vertical axis of the support assembly, and movement control devices configured and positioned to move the opposing walls along the support assembly to control dimensions of a discharge outlet at least partially defined by converging ends of the opposing walls; a liner assembly comprising liner structures at least partially overlying inner surfaces of the opposing walls and configured to remain at least partially stationary relative to the opposing walls during movement of the opposing walls; and pressure sensors between the inner surfaces of opposing walls and portions of the liner structures thereover. A flow rate of the at least one bulk solid from the hopper apparatus is controlled, using the control logic in combination with the computer assembly, at least partially based on flowability characteristics of the at least one bulk solid as determined by the computer assembly responsive at least in part to output from the pressure sensors.

DETAILED DESCRIPTION

Figure 1:
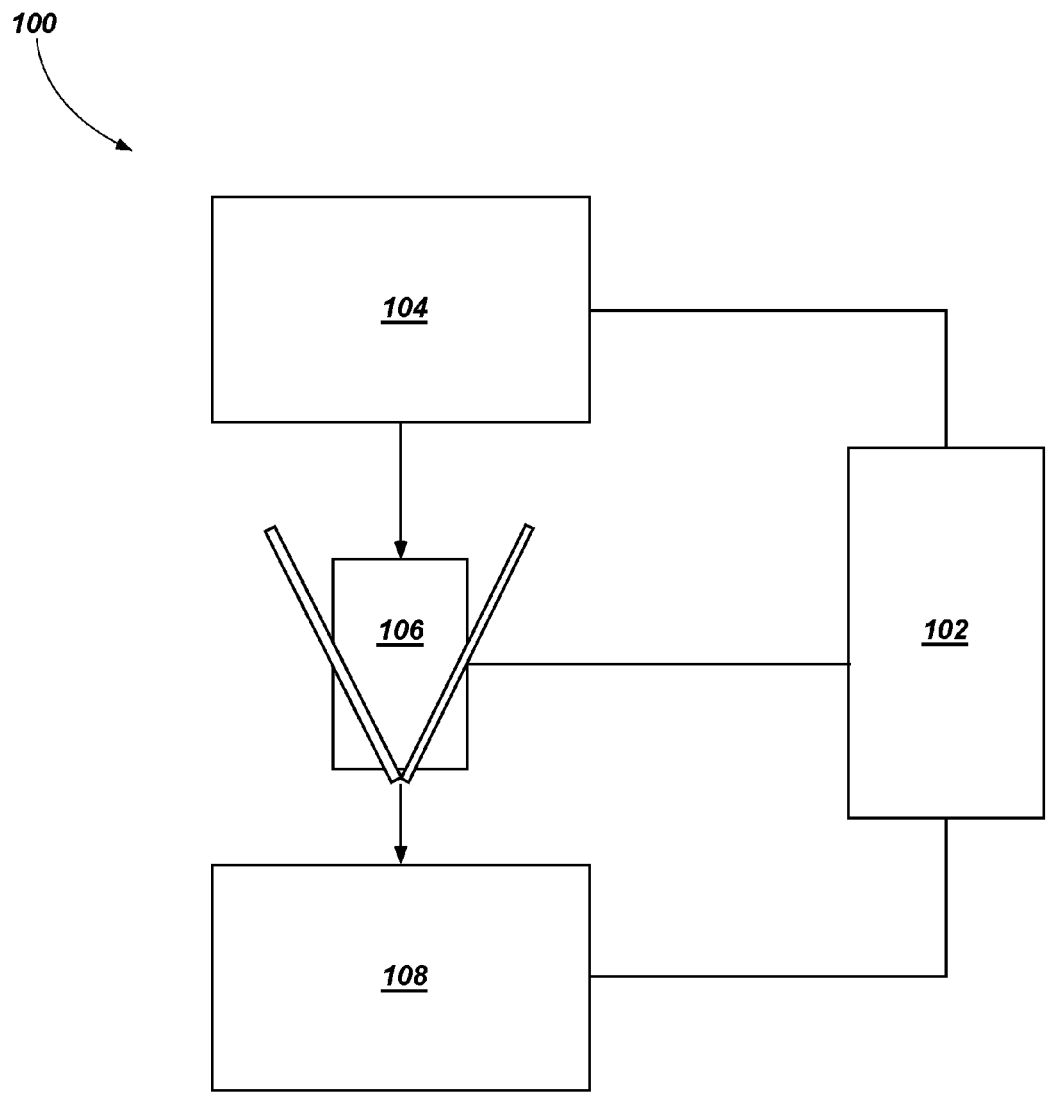
FIG. 1 is a simplified flow diagram of a bulk solids processing system, in accordance with embodiments of the disclosure.

Hopper apparatuses for processing a bulk solid are described, as are related systems and methods. In some embodiments, a hopper apparatus includes a support assembly, a movable wall assembly coupled to the support assembly, a liner assembly coupled to the support assembly and covering portions of the movable wall assembly, and a plurality of pressure sensors positioned between portions of the liner assembly and the covered portions of the movable wall assembly. The movable wall assembly may include opposing, angled movable walls and movement control devices. The opposing, angled movable walls may be movably (e.g., slidably) connected to opposing angled structures of the support assembly and oriented at acute angles relative to a central vertical axis of the support assembly. The movement control devices may be configured and positioned to move the opposing walls along the opposing angled structures of the support assembly to control dimensions of a discharge outlet at least partially defined by converging ends of the opposing walls. The liner assembly comprises liner structures at least partially overlying inner surfaces of the opposing, angled movable walls of the movable wall assembly and configured to remain at least partially (e.g., substantially) stationary relative to the opposing, angled movable walls during movement of the opposing, angled movable walls. The pressure sensors may be positioned between the inner surfaces of opposing, angled movable walls and portions of the liner structures thereover, and may be configured and operated to measure compressive pressure applied to the hopper apparatus by at least one bulk solid. The hopper apparatus may be operatively associated with a bulk solids source (e.g., a conveyor) and a main computer/electronics assembly. The main computer/electronics assembly may communicate with and control the hopper apparatus to characterize the flowability of a bulk solid delivered (e.g., continuously delivered) into the hopper apparatus from the bulk solids source in real time, and to automatically control a flow rate of the bulk solid from the hopper apparatus. The apparatuses, systems, and methods of the disclosure may be used to efficiently characterize the flowability of one or more bulk solids and effect substantially continuous and uniform flow of the bulk solid(s), reducing costs and risks associated with processing the bulk solid(s) as compared to conventional apparatuses, conventional systems, and conventional methods of processing a bulk solid.

In the following detailed description, reference is made to the accompanying drawings that form a part hereof and, in which is shown by way of illustration, specific embodiments in which the disclosure may be practiced. These embodiments are described in sufficient detail to enable those of ordinary skill in the art to practice that described in this disclosure, and it is to be understood that other embodiments may be utilized, and that structural, logical, and electrical changes may be made within the scope of the disclosure.

In addition, it is noted that the embodiments and portions thereof may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, an operation, a procedure, a subroutine, a subprogram, etc. Furthermore, the methods disclosed herein may be implemented in hardware, software, or a combination thereof. When executed as firmware or software, the instructions for performing the methods and processes described herein may be stored on a computer-readable medium. A computer-readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory. Furthermore, some methods disclosed herein may include human operators initiating commands or otherwise performing operations that may affect components of the system, including selecting instructions when prompted by the software.

Referring in general to the following description and accompanying drawings, various embodiments of the disclosure are illustrated to show its structure and method of operation. Common elements of the illustrated embodiments are designated with like reference numerals. It should be understood that the figures presented are not meant to be illustrative of actual views of any particular portion of the actual structure, system, or method, but are merely idealized representations employed to more clearly and fully depict the disclosure as defined by the claims below.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of embodiments of the disclosure and such term is used in preference to the more restrictive term "is" so as to avoid any implication that other, compatible materials, structures, features and methods usable in combination therewith should, or must be, excluded.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

FIG. 1 is a simplified block diagram illustrating a bulk solids processing system 100 in accordance with embodiments of the disclosure. The bulk solids processing system 100 may be configured and operated to characterize and convey (e.g., flow) one or more bulk solids. As shown in FIG. 1, the bulk solids processing system 100 may be formed of and include a main computer/electronics assembly 102, a bulk solids source 104, a hopper apparatus 106, and an additional apparatus 108. The bulk solids processing system 100 may employ the hopper apparatus 106 to characterize and substantially continuously flow at least one bulk solid. With the description as provided below, it will be readily apparent to one of ordinary skill in the art that the bulk solids processing system 100 described herein may be used in various applications. In other words, the bulk solids processing system 100 may be used whenever it is desired to characterize and control the flow of one or more bulk solids.

The main computer/electronics assembly 102 may serve as a common interface facilitating the simple and efficient control and analysis of various components (e.g., the bulk solids source 104, the hopper apparatus 106, one or more additional apparatuses downstream of the hopper apparatus 106, one or more additional apparatuses upstream of the bulk solids source 104, etc.) of the bulk solids processing system 100. The main computer/electronics assembly 102 may include devices (e.g., multichannel analyzers, analog-to-digital converters, pulse counters, amplifiers, etc.) for receiving and analyzing data from the different components of the bulk solids processing system 100. In addition, the main computer/electronics assembly 102 may include input devices (e.g., mouse, keyboard, etc.) through which an operator may input information, operate the main computer/electronics assembly 102, and/or electronically operate other operations of the various components of the bulk solids processing system 100. Furthermore, the main computer/electronics assembly 102 may include output devices or other peripheral devices (e.g., monitors, printers, speakers, etc.) from which an operator may interpret results of measurements, characterization of the measurements, the operational status of the various components of bulk solids processing system 100, or other similar information. The main computer/electronics assembly 102 may also include storage media such as hard drives, external hard drives, Flash memory, RAM, ROM, DVDs, and other computer-readable media for storing information related to measurements or status of the various components of the bulk solids processing system 100, as well as instructions for operation of bulk solids processing system 100.

As noted above, computer-readable media, such as storage media, may also be used by main computer/electronics assembly 102 for executing instructions and operations related to performing, analyzing, characterizing measurements, and/or for controlling various components of the bulk solids processing system 100. In other words, the main computer/electronics assembly 102 includes control logic, which may include instructions that permit the bulk solids processing system 100 to operate. The main computer/electronics assembly 102 may utilize control logic to automatically monitor and automatically control (e.g., activate, deactivate, move, position, etc.) various components (e.g., conveyors, pressure devices, level detectors, discharge outlets, supplemental computer/electronics assemblies, gear motors, etc.) of the bulk solids processing system 100. The control logic may continuously monitor the operability of the various components as well as the flow of one or more bulk solids operatively associated therewith, and may automatically change operating parameters of the various components to compensate for changes in the properties (e.g., rheological properties) of the one or more bulk solids. The control logic may automatically determine, based on measurement data and finite element analysis, different rheological properties of the bulk solid(s) prior to further action (e.g., flow rate modification, hopper discharge opening width modification, etc.) with respect to the bulk solid(s). The control logic may also include a user interface, which may provide operators with prompts and directions for simplified operation for inexperienced operators. The control logic may further include instructions for other operations such as automated calibration, data acquisition, analysis, and data storage. Some of these operations are described in further below.

With continued reference to FIG. 1, the bulk solid source 104 may comprise at least one device or apparatus configured and operated to transfer (e.g., convey, deliver, flow, etc.) at least one bulk solid to the hopper apparatus 106. The bulk solid source 104 may be in electronic communication (e.g., wireless communication) with the main computer/electronics assembly 102 and in fluid communication with the hopper apparatus 106. The bulk solid source 104 may be configured to receive an output (e.g., wireless signal) from the main computer/electronics assembly 102 and to adjust a flow rate of the bulk solid therefrom and to the hopper apparatus 106 at least partially based on the output. By way of non-limiting example, the bulk solid source 104 may comprise at least one conveyor device, such as one or more of a screw conveyor, a drag conveyor (e.g., a tubular drag conveyor), and a vacuum conveyor. In some embodiments, the bulk solid source 104 comprises a screw conveyor. Suitable configurations for the bulk solid source 104 are well known in the art, and therefore are not described in detail herein.

The additional apparatus 108 may comprise at least one device or apparatus configured and operated to receive at least one bulk solid from the hopper apparatus 106. By way of non-limiting example, the additional apparatus 108 may comprise one or more of a diverter device (e.g., a sorting device, such as a multi-outlet device), an additional conveyor device (e.g., a belt conveyor, a screw conveyor, a drag conveyor, a vacuum conveyor, etc.), and a containment device (e.g., a storage vessel). In some embodiments, the additional apparatus 108 comprises a diverter device. The diverter device may be configured and operated to at least partially (e.g., substantially) divert a bulk solid received from the hopper apparatus 106 in a first direction (e.g., a first flow path) if a flowability of the bulk solid characterized using the hopper apparatus 106 (described in further detail below) is within predetermined boundaries, and to at least partially (e.g., substantially) divert bulk solid(s) received from the hopper apparatus 106 in a second, different direction (e.g., a second flow path) if the flowability of the bulk solid characterized using the hopper apparatus 106 is outside of the predetermined boundaries. Suitable diverter devices are commercially available from numerous sources, such as from Vortex (*Salina*, KS). The additional apparatus 108 may be in electronic communication (e.g., wireless communication) with the main computer/electronics assembly 102. The additional apparatus 108 may be configured to receive an output (e.g., wireless signal) from the main computer/electronics assembly 102 and to selectively adjust one or more operational parameters thereof (e.g., gate positions, outlet opening sizes, material flow rate(s) therethrough, etc.) based on the output.

The hopper apparatus 106 may be positioned downstream of the bulk solid source 104 and upstream of the additional apparatus 108, and may be configured and operated to transfer a bulk solid received from the bulk solid source 104 to the additional apparatus 108. As shown in FIG. 1, the hopper apparatus 106 may be in electronic communication (e.g., wireless communication) with the main computer/electronics assembly 102. The main computer/electronics assembly 102 may monitor and control various components of the hopper apparatus 106 to determine one or more rheological proprieties (e.g., bulk density, particle size distribution, particle shape distribution, microstructure, compressibility, elastic recovery, shear strength, equipment wall friction, equilibrium moisture content, etc.) of a bulk solid present within the hopper apparatus 106 and adjust a flow rate of the bulk solid from the hopper apparatus 106. As described in further detail below, the hopper apparatus 106 may be configured and operated to output measurement data (e.g., pressure measurement data, bulk solid fill level data, discharge opening size data, etc.) to the main computer/electronics assembly 102, to receive inputs (e.g., wireless communications) from the main computer/electronics assembly 102, and to modify a position of one or more components thereof (e.g., opposing, angled movable walls thereof) to adjust a flow rate of bulk solid therefrom at least partially based on the inputs received from the main computer/electronics assembly 102.

Figure 2A:
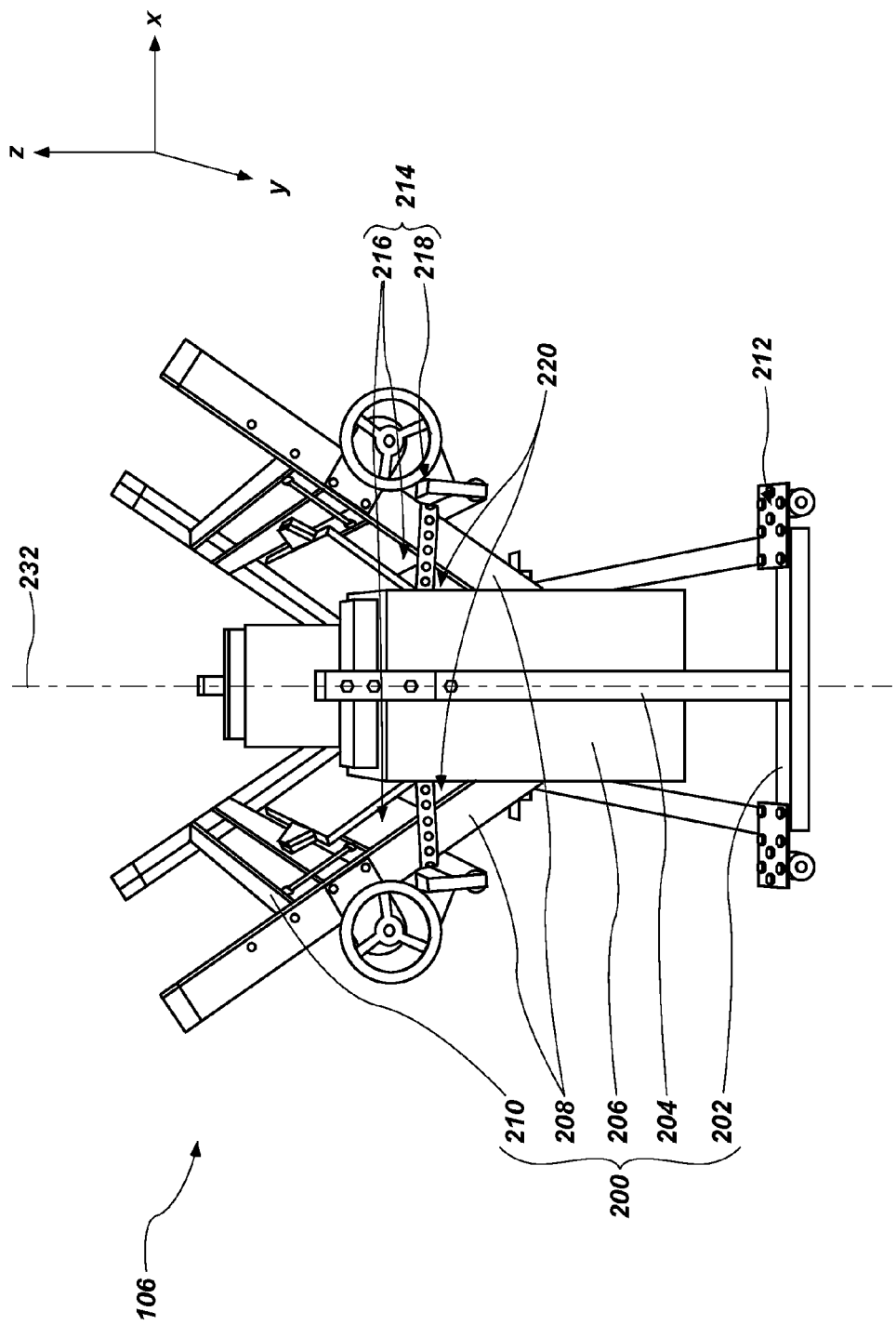
FIG. 2A is a simplified perspective view of a hopper apparatus of the bulk solid processing system depicted in FIG. 1, in accordance with embodiments of the disclosure.
Figure 2B:
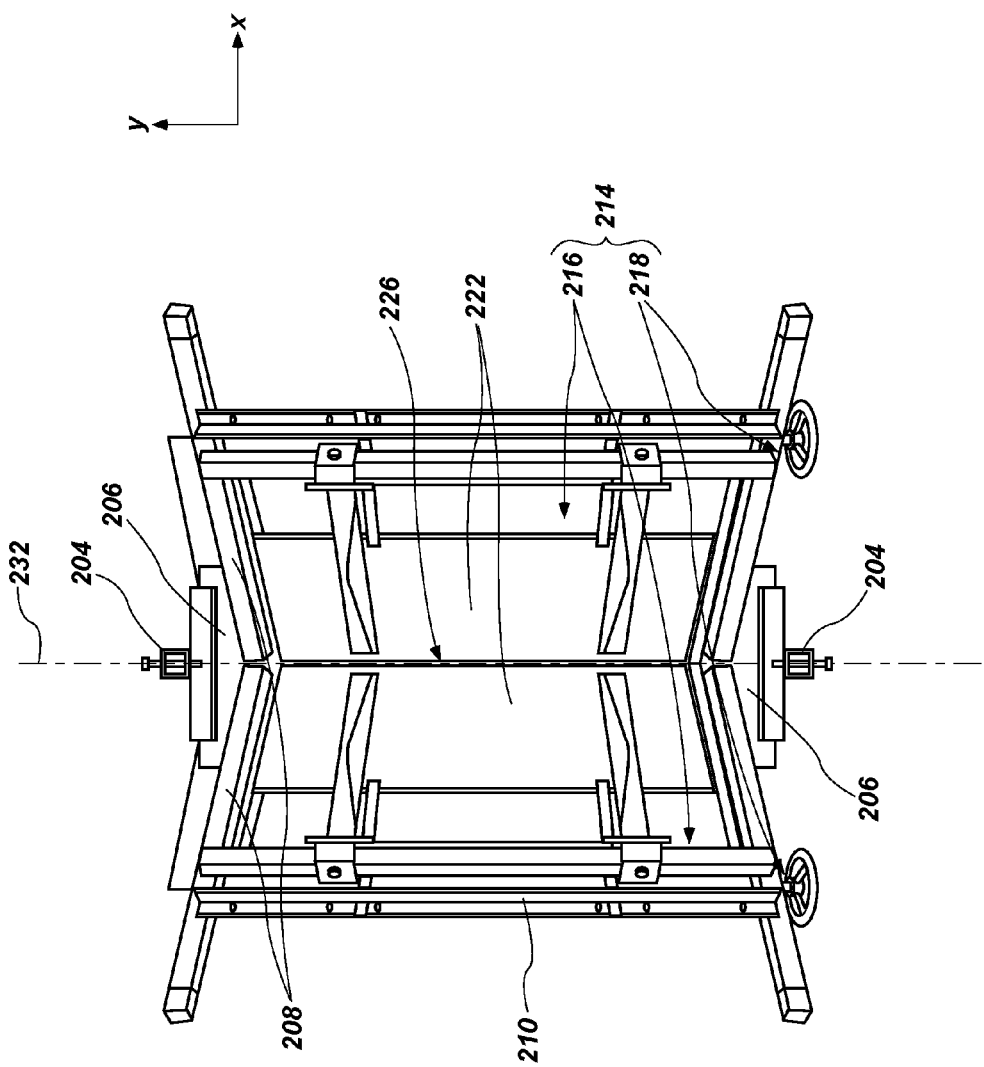
FIG. 2B is a simplified top-down view of a hopper apparatus depicted in FIG. 2A, in accordance with embodiments of the disclosure.
Figure 2C:
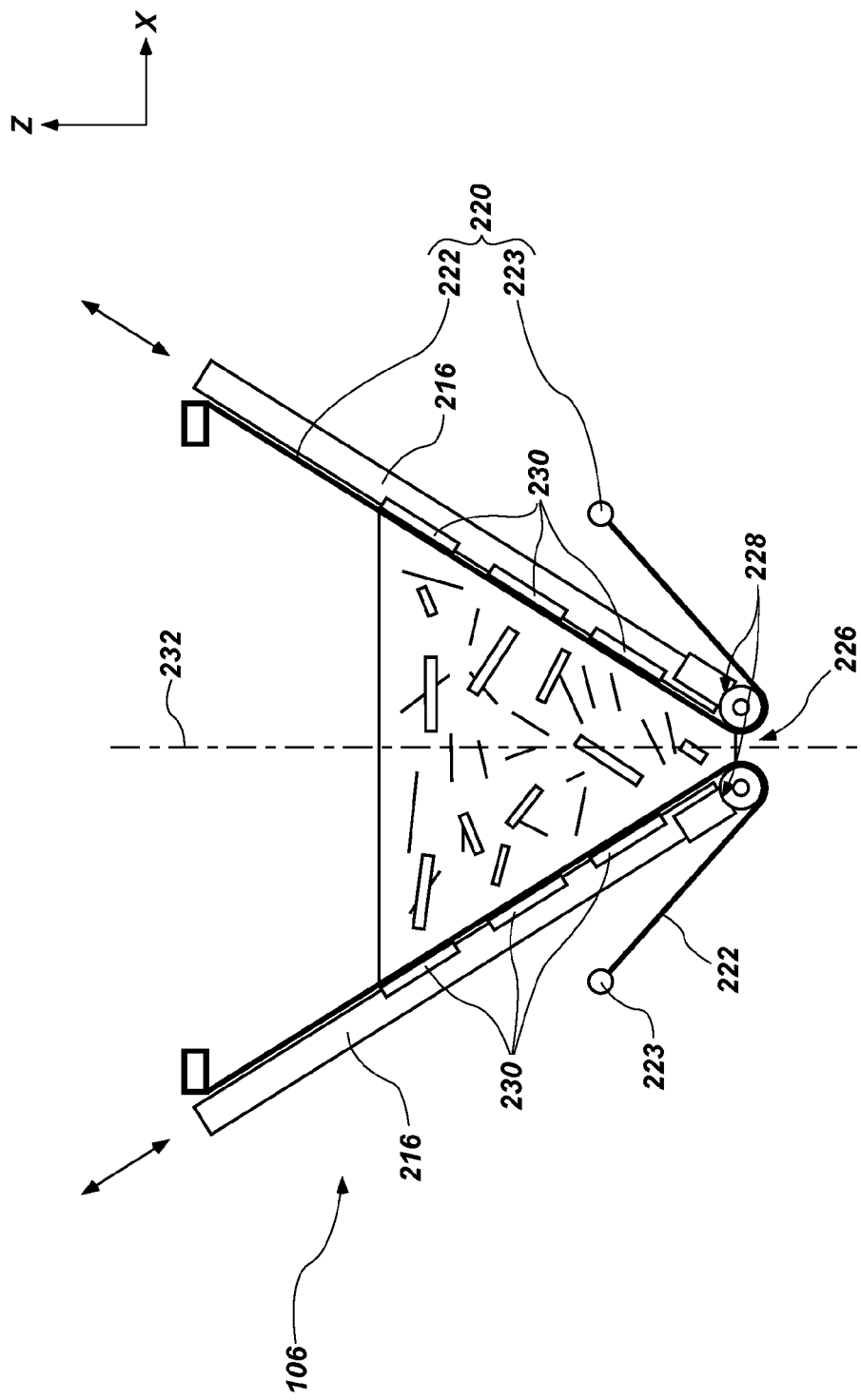
FIG. 2C is a simplified transverse cross-sectional view of the hopper apparatus depicted in FIGS. 2A and 2B, in accordance with embodiments of the disclosure.

FIG. 2A is a simplified perspective view of the hopper apparatus 106, in accordance with embodiments of the disclosure. As described in further detail below, the hopper apparatus 106 includes a support assembly 200, a movable wall assembly 214 coupled to and carried by the support assembly 200, and a liner assembly 220 coupled to and carried by the support assembly 200 and covering portions (e.g., opposing, angled movable walls 216) of the movable wall assembly 214. FIG. 2B is a simplified top down view of the hopper apparatus 106 depicted in FIG. 2A. FIG. 2C is a simplified transverse cross-sectional view of the hopper apparatus 106 depicted in FIGS. 2A and 2B with the support assembly 200 omitted for clarity in illustrating and describing other features and components of the hopper apparatus 106. As shown in FIG. 2C, and described in further detail below, the hopper apparatus 106 further includes a plurality of pressure sensors 230 positioned between the portions of the movable wall assembly 214 (FIG. 2A) and the liner assembly 220 (e.g., between the opposing, angled movable walls 216 of the movable wall assembly 214 and opposing liner structures 222 of the liner assembly 220).

Referring to FIG. 2A, the support assembly 200 of the hopper apparatus 106 may be configured and operated to support (e.g., carry) and position other components (e.g., the movable wall assembly 214, the liner assembly 220, etc.) of the hopper apparatus 106 during use and operation of the hopper apparatus 106. For example, as shown in FIG. 2A, the support assembly 200 may include a base structure 202, vertically-extending structures 204 attached (e.g., coupled, bolted, bonded, welded, etc.) to and at least partially carried by the base structure 202, end structures 206 attached to and at least partially carried by the vertically-extending structures 204, V-shaped structures 208 attached to and at least partially carried by the end structures 206, and horizontally-extending structures 210 attached to and at least partially carried by the V-shaped structures 208.

The base structure 202 may exhibit any configuration (e.g., shape, size, material composition, component arrangement, etc.) sufficient to provide stability to the hopper apparatus 106 and to support the other components of the hopper apparatus 106. By way of non-limiting example, as shown in FIG. 2A, the base structure 202 may exhibit a generally rectangular shape including interconnected structures (e.g., beam structures, such as square beams, I-beams, L-beams, etc.; tubes; rods; etc.) horizontally extending in the X-direction and the Y-direction. The base structure 202 may be formed of and include one or more rigid materials including, but not limited to, one or more of a metal material (e.g., a metal, a metal alloy, a metal nitride, a metal silicide, a metal carbide, a metal oxide, combinations thereof, etc.), a ceramic material, and a ceramic-metal composite material, any such material being selected in consideration of the bulk solids being processed and the environment in which bulk solids processing system 100 is to be operated. In some embodiments, the base structure 202 is formed of and includes a metal alloy (e.g., a steel alloy).

The vertically-extending structures 204 may each exhibit any configuration sufficient to support the other components of the hopper apparatus 106 at least partially carried thereby.

By way of non-limiting example, as shown in FIG. 2A, the vertically-extending structures 204 may comprise at least two opposing structures (e.g., opposing beam structures, such as opposing square beams, opposing I-beams, opposing L-beams, etc.; opposing tubes; opposing rods; etc.) coupled to and vertically extending in the Z-direction away from the base structure 202.

The end structures 206 may each exhibit any configuration sufficient to support the other components of the hopper apparatus 106 at least partially carried thereby. The end structures 206 may support the V-shaped structures 208, and may partially define an interior of the hopper apparatus 106 to receive one or more bulk solids during use and operation of the hopper apparatus 106. By way of non-limiting example, as shown in FIGS. 2A and 2B, the end structures 206 may comprise at least two opposing structures (e.g., opposing plate structures) coupled to the vertically-extending structures 204 and extending horizontally outward in the X-direction away from the vertically-extending structures 204.

The V-shaped structures 208 may each exhibit any configuration sufficient to support, position, and orient other components of the hopper apparatus 106, such as the horizontally-extending structures 210 of the support structure 200, and components of the movable wall assembly 214 (e.g., the opposing, angled movable walls 216) and the liner assembly 220 (e.g., the opposing liner structures 222 (FIGS. 2B and 2C)). By way of non-limiting example, as shown in FIGS. 2A and 2B, the support structure 200 may include at least two opposing (e.g., in the Y-direction) V-shaped structures 208 coupled to the end structures 206, each of the opposing V-shaped structures 208 including opposing (e.g., in the X-direction) angled structures (e.g., opposing beam structures, such as opposing L-beams, opposing I-beams, etc.; opposing tubes; opposing rods; etc.) extending upwardly (e.g., in the Z-direction) and outwardly (e.g., in the X-direction) away from one another and the end structures 206. Put another way, the opposing angled structures of each of the opposing V-shaped structures 208 may downwardly and inwardly converge toward one another and a central vertical axis 232 of the hopper apparatus 106. The opposing V-shaped structures 208 may serve as tracks (e.g., rails, slide rods, etc.) for the opposing, angled movable walls 216 of the movable wall assembly 214. Angles of each of the opposing angled structures of the opposing V-shaped structures 208 may be fixed or may be adjustable, and may correspond to desired angles for the opposing, angled movable walls 216 of the movable wall assembly 214 and opposing liner structures 222 (FIGS. 2B and 2C) of the liner assembly 220, as described in further detail below. In some embodiments, each of the opposing angled structures independently exhibits an angle within a range of from about 10 degrees to about 45 degrees relative to the central vertical axis 232 of the hopper apparatus 106.

The horizontally-extending structures 210 may each exhibit any configuration sufficient to provide stability (e.g., horizontal stability) to the V-shaped structures 208 and to support other components of the hopper apparatus 106. By way of non-limiting example, as shown in FIGS. 2A and 2B, the support structure 200 may include at least two opposing (e.g., in the X-direction) horizontally-extending structures 210 coupled to and extending horizontally between (e.g., in the Y-direction) the opposing V-shaped structures 208. As described in further detail below, the horizontally-extending structures 210 may be coupled (e.g., by way of coupling devices, such as straps, wires, cables, etc.) to the opposing, angled movable walls 216 of the movable wall assembly 214 and to the opposing liner structures 222 of the liner assembly 220. The horizontally-extending structures 210 serve as anchor structures for movement of the opposing, angled movable walls 216 through use of movement control devices 218 of the movable wall assembly 214.

The support assembly 200, including the various components thereof (e.g., the base structure 202, the vertically-extending structures 204, the end structures 206, the V-shaped structures 208, the horizontally-extending structures 210, etc.), may be formed of and include one or more rigid materials including, but not limited to, one or more of at least one metal material, at least one ceramic material, at least one ceramic-metal composite material. In some embodiments, the base structure 202, the vertically-extending structures 204, the end structures 206, the V-shaped structures 208, and the horizontally-extending structures 210 of the support assembly 200 are each independently formed of and include at least one metal alloy (e.g., at least one steel alloy).

The support assembly 200 may be stationary, or may be at least partially mobile. For example, as shown in FIG. 2A, the support assembly 200 may, optionally, further include wheel assemblies 212 connected (e.g., attached, coupled, etc.) to one or more other portions thereof (e.g., to the base structure 202) to facilitate movement of the hopper apparatus 106 in one or more directions (e.g., the X-direction and the Y-direction). One or more of the wheel assemblies 212 may, optionally, include a locking mechanism configured to at least partially secure the support assembly 200 in a desired position during use and operation of the hopper apparatus 106. In further embodiments, the support assembly 200 may employ a different means of movement. For example, the support assembly 200 may be connected to a track assembly facilitating movement of the support assembly 200 in one or more directions.

While FIGS. 2A-2C depict a particular configuration of the support assembly 200, the support assembly 200 may exhibit a different configuration, such as a configuration exhibiting one or more of a different size, a different shape, different features, different feature spacing, different components, and a different arrangement of components. FIGS. 2A-2C illustrate just one non-limiting example of the support assembly 200. For example, in additional embodiments, the support assembly 200 may include a different configuration of one or more of the base structure 202, the vertically-extending structures 204, the end structures 206, the V-shaped structures 208, the horizontally-extending structures 210, and the wheel assemblies 212.

Referring to FIG. 2A, the movable wall assembly 214 may include opposing, angled movable walls 216 and movement control devices 218 operatively associated with the opposing, angled movable walls 216. The opposing, angled movable walls 216 may be movably connected (e.g., slidably mounted) to the V-shaped structures 208 of the support assembly 200 to effect linear movement of the movable walls 216, and the movement control devices 218 may be coupled (e.g., by way of coupling structures, such as wires, cables, straps, etc.) to the opposing, angled movable walls 216 and affixed to one or more components (e.g., the V-shaped structures 208) of the support structure 200.

Each of the opposing, angled movable walls 216 may independently exhibit any desired geometric configuration (e.g., size and shape), position, and orientation permitting the hopper apparatus 106 to at least temporarily hold a desired quantity (e.g., volume) of bulk solid, and also permitting a desired flow rate of the bulk solid from the hopper apparatus 106 by adjustable positioning of the opposing, angled movable walls 216. In some embodiments, the opposing, angled movable walls 216 mirror one another. As used herein, the term "mirror" means and includes that at least two structures are mirror images of one another. As a non-limiting example, a first movable wall that mirrors a second movable wall may exhibit the substantially the same size and substantially the same shape as the second movable wall, but may outwardly extend in one or more directions (e.g., the negative X-direction) that oppose one or more directions (e.g., the positive X-direction) in which the second movable wall outwardly extends. The first movable wall may, for example, exhibit a generally negative slope, and the second movable wall may exhibit a generally positive slope. In some embodiments, each of the opposing, angled movable walls 216 exhibits a generally rectangular shape, inwardly and downwardly converges toward the central vertical axis 232 of the hopper apparatus 106, and is oriented at an acute angle relative to the central vertical axis 232 of the hopper apparatus 106. Angles of the opposing, angled movable walls 216 may correspond to angles of the opposing angled structures of the V-shaped structures 208 operatively associated therewith. The angles of the opposing, angled movable walls 216 (and, hence, the opposing angled structures of the V-shaped structures 208) may be fixed or may be adjustable, and may be selected at least partially based one or more properties of the bulk solid(s) to be received by the hopper apparatus 106 and desired wall friction characteristics of components (e.g., the opposing liner structures 222; the opposing, angled movable walls 216; etc.) of the hopper apparatus 106, as described in further detail below. In some embodiments, each of the opposing, angled movable walls 216 independently exhibits an angle within a range of from about 10 degrees to about 45 degrees relative to the central vertical axis 232 of the hopper apparatus 106. Each of the opposing, angled movable walls 216 may exhibit substantially the same angle relative to the central vertical axis 232 of the hopper apparatus 106, or the opposing, angled movable walls 216 may exhibit different angles relative to the central vertical axis 232 than one another.

Each of the opposing, angled movable walls 216 may independently be formed of and include one or more rigid materials including, but not limited to, one or more of a metal material, a ceramic material, and a ceramic-metal composite material. In some embodiments, each of the opposing, angled movable walls 216 is independently formed of and includes at least one metal alloy (e.g., at least one steel alloy). Each of the opposing, angled movable walls 216 may have substantially the same material composition, or a material composition of one or the opposing, angled movable walls 216 may be different than a material composition of the other of the opposing, angled movable walls 216.

Referring to FIG. 2B, converging ends of the opposing, angled movable walls 216 (e.g., ends of the opposing, angled movable walls 216 most proximate one another and the central vertical axis 232 of the hopper apparatus 106) may partially define an adjustable discharge opening 226 (e.g., adjustable discharge outlet) of the hopper apparatus 106. Moving (e.g., in the X-direction and the Z-direction) at least one (e.g., each) of the opposing, angled movable walls 216 away from the other of the opposing, angled movable walls 216 along the V-shaped structures 208 may increase a width of the adjustable discharge opening 226. Conversely, moving (e.g., in the X-direction and the Z-direction) at least one (e.g., each) of the opposing, angled movable walls 216 toward the other of the opposing, angled movable walls 216 along the V-shaped structures 208 may decrease the width of or even close the adjustable discharge opening 226.

With returned reference to FIG. 2A, the wall movement control devices 218 of the movable wall assembly 214 may comprise any devices configured and positioned to at least partially control the movement of the opposing, angled movable walls 216. The wall movement control devices 218 may be coupled to the support assembly 200 and the opposing, angled movable walls 216 (and/or a movable structure between the opposing, angled movable walls 216 and the V-shaped structures 208 of the support assembly 200), and may be configured and operated to reversibly move the opposing, angled movable walls 216 on or over the V-shaped structures 208 of the support assembly 200. The wall movement control devices 218 may modify (e.g., automatically modify, through use of computer numerical control) positions of the opposing, angled movable walls 216 relative to one another during use and operation of the hopper apparatus 106. The wall movement control devices 218 may move (e.g., slide, rotate) the opposing, angled movable walls 216 relative to a location (e.g., the central vertical axis 232 of the hopper apparatus 106) where the opposing, angled movable walls 216 meet when the opposing, angled movable walls 216 are disposed in a fully closed position. As a non-limiting example, the wall movement control devices 218 may comprise winch devices (e.g., motorized winch devices).

Referring to FIG. 2C, the movable wall assembly 214 may, optionally, further include wheel assemblies 228 connected (e.g., attached, coupled, etc.) to the converging ends of the opposing, angled movable walls 216 (e.g., ends of the opposing, angled movable walls 216 most proximate the central vertical axis 232 of the hopper apparatus 106). The wheel assemblies 228 may assist with the movement of the opposing, angled movable walls 216 along the V-shaped structures 208 of the support assembly 200, may assist in keeping the opposing liner structures 222 of the liner assembly 220 taut during movement of the opposing, angled movable walls 216, and/or may assist in mitigating (e.g., preventing) undesirable deformations of the opposing liner structures 222 of the liner assembly 220 during movement of the opposing, angled movable walls 216. In additional embodiments, the wheel assemblies 228 may be omitted (e.g., absent) from the movable wall assembly 214. For example, the opposing, angled movable walls 216 may exhibit one or more of arcuate (e.g., curved, rounded, etc.) and beveled converging ends that facilitate desired movement of the opposing, angled movable walls 216, keep the opposing liner structures 222 of the liner assembly 220 taut during movement of the opposing, angled movable walls 216, and/or mitigate (e.g., prevent) undesirable deformations of the opposing liner structures 222 of the liner assembly 220 during movement of the opposing, angled movable walls 216.

Still referring to FIG. 2C, the liner assembly 220 may include opposing liner structures 222 and actuator devices 223 (e.g., linear actuator devices, such as hydraulic ram devices, motorized stage devices, etc.; spool devices; etc.) operatively associated with the opposing liner structures 222. First ends of opposing liner structures 222 may be affixed (e.g., attached by way of coupling structures, such as wires, cables, straps, etc.) to one or more of the horizontally-extending structures 210 (FIGS. 2A and 2B) and the V-shaped structures 208 (FIGS. 2A and 2B) of the support structure 200 (FIG. 2A), and the actuator devices 223 may be affixed to each of second ends of the opposing liner structures 222 and one or more components (e.g., the V-shaped structures 208 shown in FIGS. 2A and 2B) of the support structure 200 (FIG. 2A).

As shown in FIGS. 2B and 2C, the opposing liner structures 222 may at least partially cover inner surfaces of the opposing, angled movable walls 216. The opposing liner structures 222 may be attached to the support structure 200 (e.g., to one or more of the horizontally-extending structures 210 and the V-shaped structures 208) and the actuator devices 223 such that movement (e.g., in the Z-direction and the X-direction) of the opposing, angled movable walls 216 during use and operation of the hopper apparatus 106 does not result in similar movement of the opposing liner structures 222. Put another way, the opposing liner structures 222 may remain at least partially (e.g., substantially) stationary relative to the opposing, angled movable walls 216 during use and operation of the hopper apparatus 106. Keeping the opposing liner structures 222 at least partially stationary relative to the movement of the opposing, angled movable walls 216 may minimize impediments to bulk solid flow that may otherwise result from the movement of the opposing, angled movable walls 216 (e.g., due to friction effects).

The opposing liner structures 222 may exhibit any configurations sufficient to at least partially cover inner surfaces of the opposing, angled movable walls 216 of the movable wall assembly 214, and to facilitate desired adjustment of the dimensions (e.g., width) of the adjustable discharge opening 226 of the hopper apparatus 106 upon the adjustment of the positions of the opposing, angled movable walls 216. By way of non-limiting example, the opposing liner structures 222 may comprise sheets (e.g., foils) of material (e.g., metal materials, such as metal(s), metal alloy(s), etc.; polymeric materials, such as polyurethane, TIVAR® 88, high molecular weight polyethylene, etc.; etc.) exhibiting thicknesses permitting the opposing liner structures 222 to bendably deform and either partially wind (e.g., coil, wrap, etc.) or partially unwind (e.g., uncoil, unwrap, etc.) upon movement of the opposing liner structures 222. In some embodiments, the opposing liner structures 222 comprise metal alloy (e.g., steel alloy) sheets having a thickness less than or equal to about 0.1 millimeter (mm). The opposing liner structures 222 may, optionally, be selected to have a lower coefficient of friction than the opposing, angled movable walls 216 to improve wall slip and enhance flow of bulk solid(s) through the hopper apparatus 106.

The actuator devices 223 may comprise any devices configured and operated to maintain the opposing liner structures 222 in a substantially taut state around one or more portions of the opposing, angled movable walls 216 during use and operation of the hopper apparatus 106. The actuator devices 223 may be configured and operated to wind (e.g., coil) or unwind (e.g., uncoil) portions of the opposing liner structures 222 upon movement of the opposing, angled movable walls 216. In addition, the actuator devices 223 may be configured and operated to maintain dimensions (e.g., lengths) of portions of the opposing liner structures 222 covering the opposing, angled movable walls 216 once desired positions of the opposing, angled movable walls 216 have been achieved. Suitable configurations for the actuator devices 223 are well known in the art, and therefore are not described in detail herein. In some embodiments, the actuator devices 223 employ one or more of suspended weights and springs to maintain the opposing liner structures 222 in a substantially taut state around one or more portions of the opposing, angled movable walls 216 during use and operation of the hopper apparatus 106.

With continued reference to FIG. 2C, the hopper apparatus 106 includes pressure sensors 230 located between the opposing, angled movable walls 216 and the opposing liner structures 222. The pressure sensors 230 may be located in, on, or over inner surfaces of the opposing, angled movable walls 216, and the opposing liner structures 222 may be located on or over the pressure sensors 230. The pressure sensors 230 may each independently comprise any device configured and operated to measure and communicate pressure at one or more locations within the hopper apparatus 106. By way of non-limiting example, the pressure sensors 230 may comprise one or more of load cells, pressure plates, strain gauges, force sensitive resistors, force sensitive capacitors, and piezoelectric transducers. Suitable configurations for the pressure sensors 230 are well known in the art, and are therefore not described in detail herein. The pressure sensors 230 may, for example, be used to determine and communicate a fill level of bulk solid within the hopper apparatus 106. The main computer/electronics assembly 102 (FIG. 1) may then adjust (e.g., by way of computer numerical control) or maintain positions of the opposing, angled movable walls 216 to control (e.g., increase or decrease) the dimensions of the adjustable discharge opening 226 at least partially based on the determined fill level to facilitate a desired flow rate of the bulk solid from the hopper apparatus 106, as described in further detail below. In additional embodiments, one or more other devices (e.g., an optoelectronic level sensor, such as a laser scanner device) may be employed (e.g., in conjunction with or as an alternative to one or more of the pressure sensors 230) to determine and communicate the bulk solid fill level within the hopper apparatus 106. The pressure sensors 230 may also be utilized to measure compressive pressure applied by a bulk solid to different locations (e.g., locations proximate the adjustable discharge opening 226) within the hopper apparatus 106 and determine a pressure distribution for the bulk solid within hopper apparatus 106. The determined pressure distribution (and/or the measured compressive pressure(s)) may then be employed, along with one or more additional measurements (e.g., the minimum size of the adjustable discharge opening 226 facilitating flow of a given bulk solid), to determine different rheological properties (e.g., bulk density, particle friction, compressibility, elastic recovery, etc.) of the bulk solid within the hopper apparatus 106, as also described in further detail below.

The hopper apparatus 106 may include any desired quantity (e.g., number) and distribution of the pressure sensors 230. The quantity and distribution of the pressure sensors 230 may at least partially depend on one or more of the dimensions of one or more components (e.g., the opposing, angled movable walls 216, the opposing liner structures 222, etc.) of the hopper apparatus 106, the type(s) of bulk solid the hopper apparatus 106 will be receiving, and the data (e.g., fill level data, positional compressive pressure data, etc.) desired to be obtained using the pressure sensors 230. In some embodiments, the hopper apparatus 106 includes at least three (3) mutually spaced pressure sensors 230 configured and positioned on a movable wall 216 and in operable contact with an overlying liner structure 222 to monitor the fill level of bulk solid within the hopper apparatus 106 and to measure compression pressure at one or more locations within the hopper apparatus 106 (e.g., at one or more locations proximate the adjustable discharge opening 226). Each of the pressure sensors 230 may be substantially the same and may be uniformly (e.g. regularly, evenly, etc.) spaced relative to the other pressure sensors 230, or at least one of the pressure sensors 230 may be different than at least one other of the pressure sensors 230 and/or may be non-uniformly (e.g., non-regularly, non-evenly, etc.) spaced relative to the other pressure sensors 230.

In addition, the hopper apparatus 106 may include other structures and/or devices, such as additional sensors (e.g., temperature sensors, audio sensors, radiation sensors, moisture sensors, pH sensors, etc.) and/or a supplemental computer/electronic assembly. If present, the supplemental computer/electronic assembly may, for example, be configured and operated to control one or more other components of the hopper apparatus 106, and may include devices (e.g., multichannel analyzers, analog-to-digital converters, etc.) for receiving and analyzing data from other components of the hopper apparatus 106 (e.g., movable wall assembly 220, the pressure sensors 230, etc.). The supplemental computer/electronics assembly may, optionally, utilize control logic similar to that employed by the main computer/electronics assembly 102 (FIG. 1) of the bulk solids processing system 100 (FIG. 1) to automatically monitor and automatically control various components of the hopper apparatus 106. Furthermore, the supplemental computer/electronics assembly may be configured and operated to communicate with the main computer/electronics assembly 102 of the bulk solids processing system 100. For example, the supplemental computer/electronics assembly may include one or more input devices configured to receive information (e.g., operational commands) from the main computer/electronics assembly 102, and one or more output devices configured to transmit other information (e.g., measurement data) to the main computer/electronics assembly 102. The supplemental computer/electronics assembly may further include storage media (e.g., hard drives, external hard drives, Flash memory, RAM, ROM, DVDs, etc.) for storing information related to measurements (e.g., radiation measurements, weight measurements, etc.) and/or the status of components of the hopper apparatus 106. If present, the supplemental computer/electronics assembly may be operatively associated with other components of the hopper apparatus 106 and the main computer/electronics assembly 102 (FIG. 1) through at least one of wired means (e.g., data cables) and wireless means (e.g., WiFi, BLUETOOTH®, ZIGBEE®, etc.). In additional embodiments, the supplemental computer/electronics assembly may be omitted.

It is noted that in FIGS. 2A-2C, the various components of the hopper apparatus 106 (e.g., the support assembly 200, the movable wall assembly 214, the liner assembly 220, the pressure sensors 230, etc.) are shown as being provided at particular locations relative to one another. However, the various components of the hopper apparatus 106 are shown in FIGS. 2A-2C at such particular locations for simplicity and not as a physical limitation. Thus, one or more of the various components of the hopper apparatus 106 may be provided at different locations relative to one another than those depicted in FIGS. 2A-2C.

Figure 3:
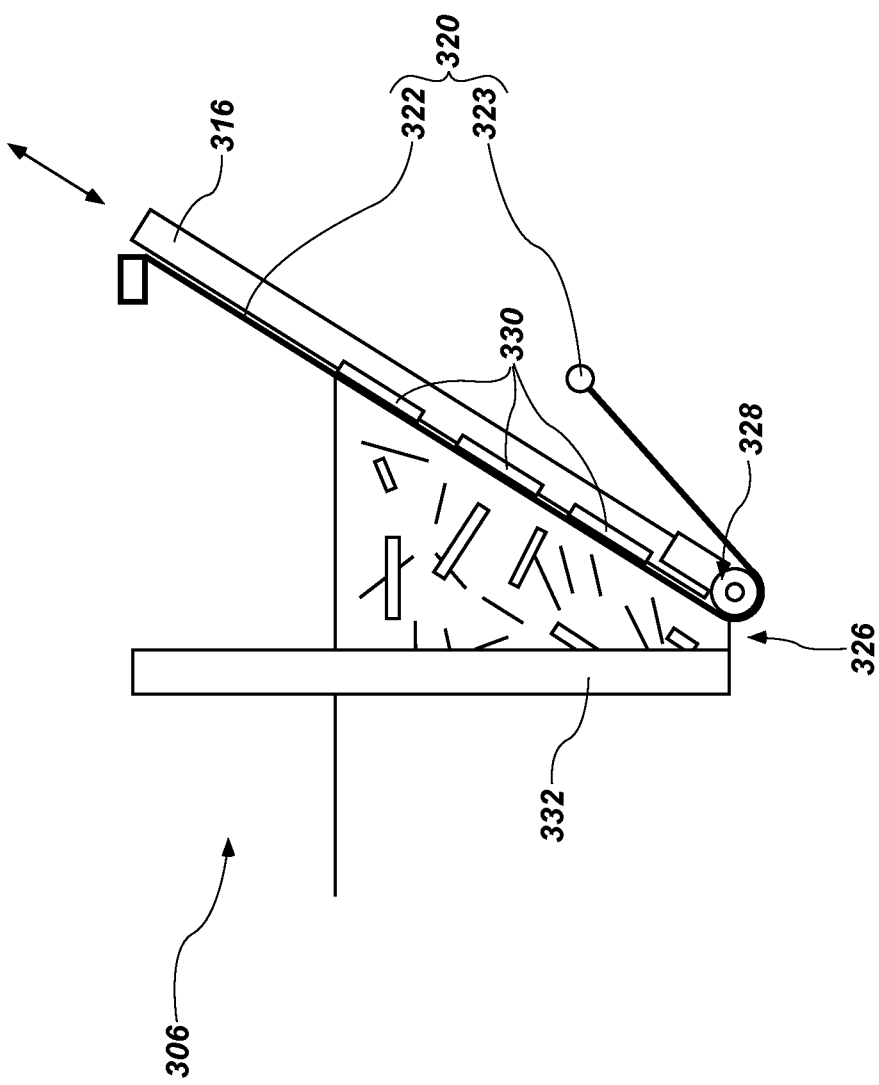
FIG. 3 is a simplified transverse cross-sectional view of a hopper apparatus, in accordance with additional embodiments of the disclosure.

Furthermore, as previously described above, the hopper apparatus 106 may be formed to exhibit a different configuration than that depicted in FIGS. 2A-2C. By way of non-limiting example, FIG. 3 is a simplified transverse cross-sectional view of a hopper apparatus 306 (with support assembly thereof omitted for clarity in illustrating and describing other features and components thereof, similar to the simplified transverse cross-sectional view of the hopper apparatus 106 depicted in FIG. 2C), in accordance with another embodiment of the disclosure. The hopper apparatus 306 may have some similar features and functionalities to the hopper apparatus 106 previously described. However, the hopper apparatus 306 may, for example, include a wall assembly having a single (e.g., only one) angled movable wall 316 (and associated movement control device substantially similar to the movement control device 218 previously described with respect to FIGS. 2A and 2B) and a stationary wall 332 opposing the single (e.g., only one) angled movable wall 316, along with one or more of different features (e.g., support structure features) and/or feature configurations (e.g., sizes, shapes, arrangements) to account for the stationary wall 332. The stationary wall 332 may be employed in place of one of the opposing, angled movable walls 216 previously described with respect to FIGS. 2A through 2C. To avoid repetition, not all features shown in FIG. 3 are described in detail herein. Rather, unless described otherwise below, features designated by a reference numeral that is a 100 increment of the reference numeral of a feature described previously in relation to one or more of FIGS. 2A-2C will be understood to be substantially similar to the feature described previously.

The stationary wall 332 may exhibit any desired geometric configuration (e.g., size and shape), position, and orientation permitting the hopper apparatus 306 to at least temporarily hold a desired quantity (e.g., volume) of bulk solid, and also permitting a desired flow rate of the bulk solid from the hopper apparatus 306 by adjustable positioning of the angled movable wall 316 opposing the stationary wall 332. As shown in FIG. 3, in some embodiments, the stationary wall 332 exhibits a generally rectangular shape as viewed from the side, and is oriented parallel to a central vertical axis of the hopper apparatus 306. In such embodiments, the orientation of the stationary wall 332 may permit the stationary wall 332 to behave like a plane of symmetry. Since, due to symmetry considerations, the stress state of a bulk solid in contact with the stationary wall 332 in such an orientation is primarily horizontal, the stress state of the bulk solid may be substantially completely measured. Such an orientation of the stationary wall 332 may, for example, avoid natural stress field disruptions that may otherwise occur when attempting to measure frictional forces between a bulk solid and a liner overlying a wall exhibiting a different (e.g., a sloped) orientation. In additional embodiments, the stationary wall 332 may be oriented at an acute angle relative to the central vertical axis of the hopper apparatus 306. The angle of the stationary wall 332 may be fixed or may be adjustable, and may be selected at least partially based on one or more properties of the bulk solid(s) to be received by the hopper apparatus 306, and desired wall friction characteristics thereof and/or of other components (e.g., a liner structure 322 located on or over the angled movable wall 316) of the hopper apparatus 306. As described in further detail below, the stationary wall 332 may, optionally, be covered with at least one liner structure may to assist in achieving a desired symmetry condition.

The stationary wall 332 may be formed of and include one or more rigid materials including, but not limited to, one or more of a metal material, a ceramic material, and a ceramic-metal composite material. In some embodiments, the stationary wall 332 is formed of and includes at least one metal alloy (e.g., at least one steel alloy). A material composition of the stationary wall 332 may be substantially the same as or may be different than a material composition of the angled movable wall 316.

As shown in FIG. 3, in contrast to the angled movable wall 316, an inner surface of the stationary wall 332 may be substantially free of (e.g., substantially uncovered by) at least one liner structure and/or at least one pressure sensor thereon or thereover (e.g., directly horizontally adjacent thereto). In additional embodiments, the inner surface of the stationary wall 332 may be at least partially covered by one or more of at least one liner structure and at least one pressure sensor. For example, in additional embodiments, the inner surface of the stationary wall 332 may be at least partially covered by a liner structure (e.g., a sheet of metal material, such as a sheet of a metal alloy; a sheet of a polymeric material; etc.) and one or more pressure sensors may be positioned between the stationary wall 332 and the liner structure. If present, the liner structure and/or the pressure sensors may respectively be substantially the same as or may respectively be different than a liner structure 322 and/or pressure sensors 330 positioned on or over an inner surface of the angled movable wall 316. In some embodiments, the liner structure may be configured and positioned to move with the bulk solid(s) within the hopper apparatus 306 during use and operation of the hopper apparatus 306. For example, the liner structure may be mounted on roller devices positioned above and below the stationary wall 332, and may slide over the stationary wall 332 during use and operation of the hopper apparatus 306. In some embodiments wherein the inner surface of the stationary wall 332 is at least partially covered by a liner structure, at least one lubricant (e.g., a dry lubricant, such as powdered graphite, etc.) may be provided between the inner surface of the stationary wall 332 and the liner structure, and the liner structure may be configured and positioned to slide over the inner surface of the stationary wall 332 during use and operation of the hopper apparatus 306.

With returned reference to FIG. 1, during use and operation of the bulk solids processing system 100, at least one bulk solid may be delivered (e.g., flowed) into the hopper apparatus 106 (or the hopper apparatus 306 previously described with respect to FIG. 3) from the bulk solid source 104. The hopper apparatus 106 may then provide measurement data (e.g., pressure measurement data, discharge opening width data, wall angle data, etc.) to the main computer/electronics assembly 102, which may then analyze the measurement data (along with other measurement data, if any, such as a weight of one or more portions of the bulk solid exiting the hopper apparatus 106) to characterize the flowability (e.g., determine rheological properties) of the bulk solid and/or to evaluate if an effluent flow rate of the bulk solid from the hopper apparatus 106 is within predetermined effluent flow rate boundaries (e.g., at or between a minimum effluent flow rate boundary and a maximum effluent flow rate boundary). If the effluent flow rate of the bulk solid is outside of the predetermined effluent flow rate boundaries (e.g., below the minimum effluent flow rate boundary or above the maximum effluent flow rate boundary), the main computer/electronics assembly 102 may automatically adjust (e.g., through computer numerical control) one or more of dimensions of the adjustable discharge opening 226 (FIGS. 2B and 2C) of the hopper apparatus 106 (e.g., by automatically adjusting positions of the opposing, angled movable walls 216 (FIGS. 2A through 2C) thereof) and angles of the opposing, angled movable walls 216 until the effluent flow rate of the bulk solid is within the predetermined effluent flow rate boundaries, may adjust one or more operational parameters of the bulk solid source 104 and/or the additional apparatus 108 based on the effluent flow rate of the bulk solid, or may halt (e.g., terminate) operation of the bulk solids processing system 100 if an acceptable effluent flow rate of the bulk solid cannot be achieved. In some embodiments, the main computer/electronics assembly 102 may automatically adjust a flow rate of the bulk solid delivered into the hopper apparatus 106 to assist in obtaining an acceptable effluent flow rate of the bulk solid. In additional embodiments, the main computer/electronics assembly 102 may automatically adjust one or more operational parameters of the additional apparatus 108 in response to the effluent flow rate of the bulk solid from the hopper apparatus 106. For example, in embodiments wherein the additional apparatus 108 comprises a diverter device, the main computer/electronics assembly 102 may automatically adjust one or more gate positions of the additional apparatus 108 to selectively divert the bulk solid in one or more directions based on the effluent flow rate of the bulk solid from the hopper apparatus 106. If the main computer/electronics assembly 102 determines that the effluent flow rate of the bulk solid from the hopper apparatus 106 is within predetermined effluent flow rate boundaries, the main computer/electronics assembly 102 may signal the additional apparatus 108 to divert the bulk solid in at least one direction for further processing and/or use. Conversely, if the main computer/electronics assembly 102 determines that the effluent flow rate of the bulk solid from the hopper apparatus 106 is outside of predetermined effluent flow rate boundaries, the main computer/electronics assembly 102 may signal the additional apparatus 108 to divert the bulk solid in at least one other direction for different processing and/or disposal. Additional details regarding operations performed during use and operation of the bulk solids processing system 100 are described in further detail below.

Figure 4:
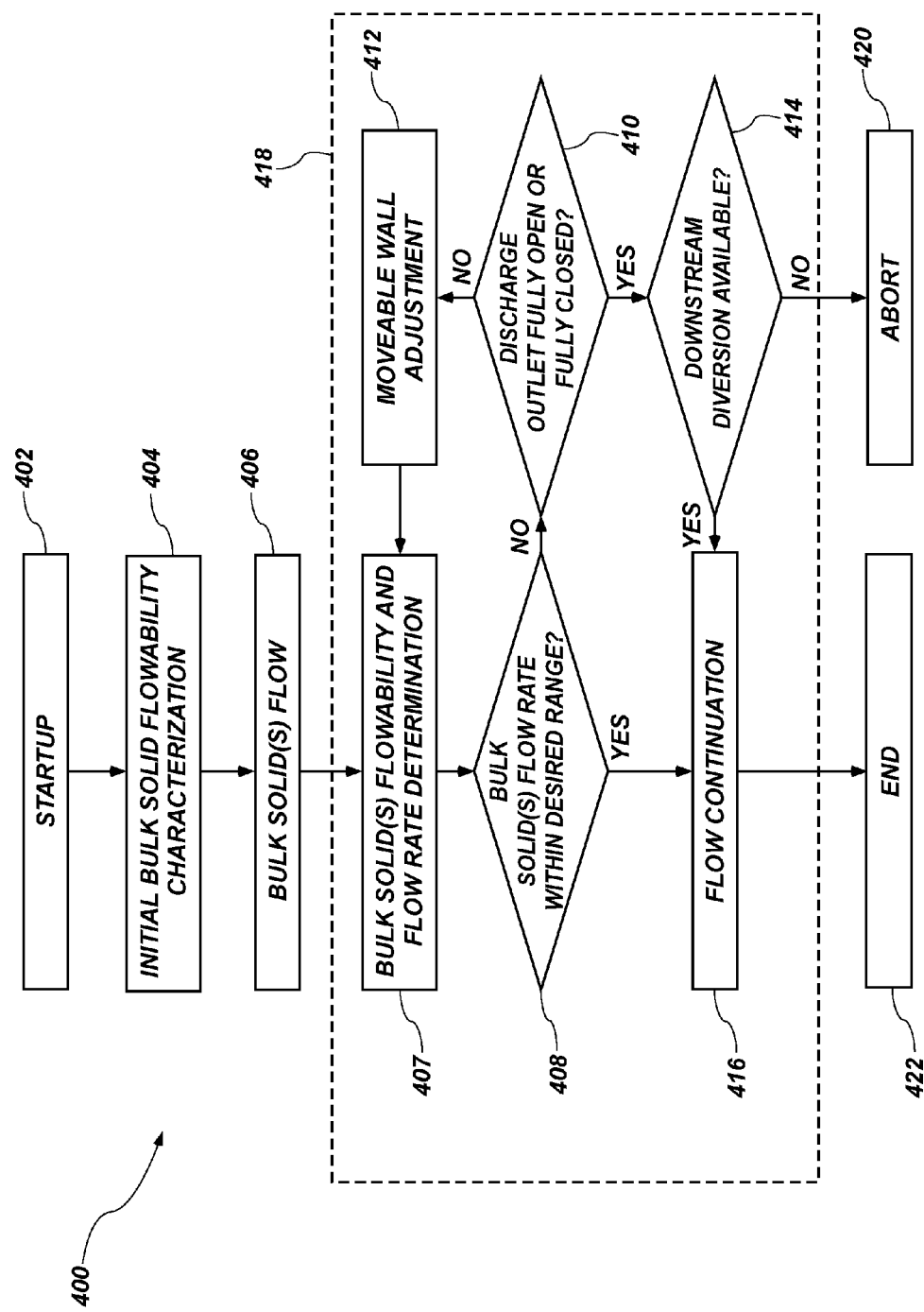
FIG. 4 is a hierarchical view of operations for a bulk solids processing system, in accordance with embodiments of the disclosure.

FIG. 4 is a hierarchical view of a process 400 for operating the bulk solids processing system 100 (FIG. 1), including the various components thereof, according to embodiments of the disclosure. The process 400 may be initiated by bulk solids processing system software being launched. For example, a bulk solids processing system software icon may be located on the desktop of a computer (e.g., a computer of the main computer/electronics assembly 102 shown in FIG. 1). An operator may press the bulk solids processing system software icon. The process 400 may include several more operations, wherein the performance of such operations may be initiated manually by an operator, automatically according to a minimum time interval between occurrences of certain events, automatically according to certain events being triggered, or any combination thereof. Many automated operations (e.g., operability verification, etc.) may not be visible to the operator during their performance.

As shown in FIG. 4, examples of operations include a startup operation 402, an operation 404 for initial bulk solid flowability characterization, an operation 406 for initiating bulk solid(s) flow, an operation 407 for continuous bulk solid(s) flowability characterization and flow rate determination, an operation 408 for checking the flow rate of the bulk solid(s) relative to predetermined flow rate boundaries, an operation 410 for checking for a fully open or a fully closed discharge opening condition based on a negative result at operation 408, an operation 412 for movable wall adjustment based on a negative result at operation 410, an operation 414 for checking if downstream diversion of the bulk solid(s) is available, an operation 416 for continuing bulk solid(s) flow based on a positive result at operation 408 or a positive result at operation 414, an operation 420 for aborting the process 400 based on a negative result at operation 414, and an operation 422 for ending the process 400. Each operation may be called and executed and may have features for termination of the program if certain situations occur or problems are detected. More or fewer operations may also exist in addition to, or in place of, certain operations shown herein. Further details regarding several of these operations are described below. The various operations shown in FIG. 4 may be utilized to operate the components (e.g., the hopper apparatus 106, including the components thereof) of the bulk solids processing system 100 depicted in FIG. 1, as described in further detail below.

The bulk solids processing system software may include a user interface for interaction with the operator. For example, the user interface may be a menu-driven graphical user interface (GUI) for ease of use and control by an operator. The user interface may perform operations automatically, through a virtual push-button interface on the computer screen, or through a combination thereof. The user interface may include pop-up windows that present options regarding system configuration or operating parameters the operator can choose from to customize bulk solid(s) flowability characterization and/or flow. The user interface may also include pop-up windows that communicate advisory information and directions to the operator.

With continued reference to FIG. 4, the startup operation 402 may include inspecting the operational condition of components (e.g., the bulk solids source 104, the hopper apparatus 106) of the bulk solids processing system 100 (FIG. 1). For example, referring collectively to FIGS. 2A-2C, the operational condition of the hopper apparatus 106, including the various components thereof (e.g., the movable wall assembly 214, the liner assembly 220, the pressure sensors 230, etc.), may be inspected (e.g., manually inspected by an operator, automatically inspected through communication with the bulk processing system software, combinations thereof, etc.). If a component of the bulk solids processing system 100 fails the inspection, operation of the bulk solids processing system 100 may be aborted until appropriate measures are taken to remedy the problem. Alternatively, if the components of the bulk solids processing system 100 pass the inspection, the bulk solids processing system software may read the startup data files used to operate and/or acquire data from the components of the bulk solids processing system 100, and operation of the components may commence. The startup operation 402 may be repeated whenever it is desired to startup and run the bulk solids processing system 100.

Next, at operation 404, rheological properties (e.g., shear strength, compressibility, effective angle of internal friction, particle size distribution, wall friction angle, equilibrium moisture content, etc.) of a bulk solid to be processed by the bulk solids processing system 100 (FIG. 1) may be determined using the hopper apparatus 106 (FIG. 1) to characterize the flowability of the bulk solid. Referring collectively to FIGS. 2A-2C and 4, the operation 404 includes providing the hopper apparatus 106 with a volume of bulk solid while the adjustable discharge opening 226 of the hopper apparatus 106 is in a closed state. The volume of bulk solid may be present in the hopper apparatus 106 at the beginning of the operation 404, or may be at least partially delivered (e.g., from the bulk solids source 104) into the hopper apparatus 106 during the operation 404. In addition, the volume of bulk solid may be settled for a period of time within the hopper apparatus 106, and/or may be compacted (e.g., using at least one compaction structure or device, such as a press device) within the hopper apparatus 106. The configuration (e.g., shape, such as a symmetrical V-shape) of the hopper apparatus 106 and uniform body force from gravity may permit the volume of bulk solid to exhibit substantially uniform compressive stress and substantially uniform shear stress within the hopper apparatus 106 until the volume of bulk solid begins to flow therefrom. Thereafter, the adjustable discharge opening 226 may be gradually opened through the controlled (e.g., computer numerically controlled) movement of the opposing, angled movable walls 216 of the hopper apparatus 106 until the bulk solid begins to flow therethrough. For given angles of the opposing, angled movable walls 216, the minimum width of the adjustable discharge opening 226 resulting in flow of the bulk solid from the hopper apparatus 106 corresponds to the critical arching width of the bulk solid. The determined critical arching width, as well as pressure measurements from the pressure sensors 230 of the hopper apparatus 106, may be compared against corresponding approximated values for a simulated flowability model for the bulk solid established through finite element analysis (FEA) to validate or modify the model, along with predicted values (e.g., a predicted critical arching width value; predicted pressure distribution values; predicted rheological property values related to the predicted critical arching width and the predicted pressure distribution values, such as shear strength, compressibility, moisture content, etc.) associated therewith, and characterize the flowability of the bulk solid.

Next, at operation 406, one or more bulk solids may be continuously flowed through the hopper apparatus 106 (FIG. 1). Referring collectively to FIGS. 1 and 2A-2C, the hopper apparatus 106 may continuously receive the bulk solid(s) from the bulk solids source 104, and may continuously flow the bulk solid(s) therefrom through the adjustable discharge opening 226. The bulk solid(s) may be delivered into and removed from the hopper apparatus 106 at one or more desired flow rates. The flow rate of bulk solid(s) from the hopper apparatus 106 may at least partially depend on the size of the adjustable discharge opening 226, and the angles of the opposing, angled movable walls 216. An initial size of the adjustable discharge opening 226 during the bulk solid(s) flow operation 406 may at least be as large as the critical arching width of the bulk solid determined during the initial bulk solid(s) flowability characterization operation 404. The flowability of the bulk solid(s) and the flow rate of the bulk solid(s) may be continuously monitored and utilized to change one or more of the width of the adjustable discharge opening 226 and the angles of the opposing, angled movable walls 216 to maintain a desired flow rate of the bulk solid(s) from the hopper apparatus 106, as described in further detail below.

Referring again to FIG. 4, operation 407 begins a continuous loop 418 including operations 407-416 to continuously characterize the flowability of at least one bulk solid being flowed through the hopper apparatus 106 (FIG. 1), continuously determine flow rate(s) of the bulk solid, automatically adjust the flow rate(s) of the bulk solid if the flow rate(s) are outside of predetermined boundaries, and continuously flow the bulk solid from the hopper apparatus 106.

Referring collectively to FIGS. 2C and 4, at operation 407, pressure measurements from the pressure sensors 230 of the hopper apparatus 106, and width measurements for the adjustable discharge opening 226 of the hopper apparatus 106 at given angles of the opposing, angled movable walls 216 may be analyzed to determine a flow rate of the bulk solid from the hopper apparatus 106 and to characterize the flowability of the bulk solid. Pressure measurements from the pressure sensors 230 may, for example, be used to generate a pressure distribution for the bulk solid within the hopper apparatus 106. The pressure distribution may identify a fill level of the bulk solid within the hopper apparatus 106, which may be used to determine a flow rate of the bulk solid from the hopper apparatus 106 in real time. In further embodiments, at least one device (e.g., at least one opto-electronic level sensor, such as a laser scanner device) may be used in conjunction with or in place of one or more of the pressure sensors 230 to determine the fill level of the bulk solid within the hopper apparatus 106 (and, hence, the flow rate of the bulk solid from the hopper apparatus 106). In addition, the pressure distribution may be used to determine rheological properties (e.g., compressibility, elastic recovery, etc.) of the bulk solid during flow of the bulk solid within and through the hopper apparatus 106. Such rheological properties, along with additional rheological properties determined at least partially based on the measured width of the adjustable discharge opening 226, may be compared against corresponding predicted values of a simulated flowability model for the bulk solid to validate or modify the model and characterize the flowability of the bulk solid in real time. The real time flowability characterization may identify problems (e.g., insufficient grinding, insufficient drying, insufficient material separation, etc.) in the bulk solids processing system 100 upstream of the hopper apparatus 106, and/or may identify process modifications (e.g., process modifications upstream of the hopper apparatus 106, process modifications downstream of the hopper apparatus 106, or combinations thereof) that may be made to accommodate the flowability characteristics of the bulk solid.

Referring to FIG. 4, at operation 408, a check is performed to determine if the flow rate of the bulk solid determined at operation 407 is within predetermined flow rate boundaries (e.g., at or between a minimum predetermined flow rate and a maximum predetermined flow rate). If the answer to the check at operation 408 is yes, the process 400 moves on to operation 416, and the bulk solid continues to be flowed from the hopper apparatus 106 (FIG. 1). In addition, one or more components of the additional apparatus 108 (FIG. 1) may be controlled (e.g., adjusted, maintained, etc.) based on the positive result of the check at operation 408. For example, if the additional apparatus 108 comprises a diverter device, one or more gates of the additional apparatus 108 may be computer numerically controlled to effectuate diversion of the bulk solid to a primary flow path facilitating additional desired processing and/or use of the bulk solid. Conversely, if the answer to the check at operation 408 is no, the continuous loop 418 moves on to operation 410.

At operation 410, a secondary check is performed to determine if the adjustable discharge outlet 226 (FIGS. 2B and 2C) of the hopper apparatus 106 (FIGS. 2A-2C) is fully open (e.g., the opposing, angled movable walls 216 of the hopper apparatus 106 are positioned on the support assembly 200 (FIG. 2A) at a maximum operational distance apart from one another) or fully closed (e.g., the opposing, angled movable walls 216 of the hopper apparatus 106 are positioned on the support assembly 200 at a minimum operational distance apart from one another). If the answer to the secondary check at operation 410 is no, the continuous loop 418 continues on to operation 412. Conversely, if the answer to the secondary check at operation 410 is yes, the continuous loop 418 moves on to operation 414.

Referring collectively to FIGS. 2A-2C and 4, at operation 412, one or more of the positions and the angles of the opposing, angled movable walls 216 of the movable wall assembly 214 of the hopper apparatus 106 may be adjusted based on the determined flow rate of the bulk solid from the hopper apparatus 106 to facilitate a modified flow rate of the bulk solid within the predetermined flow rate boundaries. If, for example, the determined flow rate of the bulk solid is less than a minimum predetermined flow rate boundary, at least one (e.g., each) of the opposing, angled movable walls 216 may be moved (e.g., in the X-direction and the Z-direction using at least one of the wall movement control devices 218) away from the other of the opposing, angled movable walls 216 (e.g., along the V-shaped structures 208 of the support assembly 200) to increase a width of the adjustable discharge opening 226. Conversely, if the determined flow rate of the bulk solid is greater than a maximum predetermined flow rate boundary, at least one (e.g., each) of the opposing, angled movable walls 216 may be moved (e.g., in the X-direction and the Z-direction wall using at least one of the movement control devices 218) toward the other of the opposing, angled movable walls 216 (e.g., along the V-shaped structures 208 of the support assembly 200) to decrease a width of the adjustable discharge opening 226. Thereafter, the continuous loop 418 may loop back to operation 407 and again characterize the flowability of the bulk solid and again determine a flow rate of the bulk solid from the hopper apparatus 106 based on additional measurement data.

At operation 414, a tertiary check is performed to determine if the bulk solid is able to be diverted from a primary flow path of the bulk solid. If the answer to the tertiary check at operation 414 is yes, the process 400 moves on to operation 416, and the bulk solid continues to be flowed from the hopper apparatus 106 (FIG. 1). In addition, one or more components of the additional apparatus 108 (FIG. 1) may be controlled (e.g., adjusted, maintained, etc.) based on the positive result of the check at operation 414. For example, if the additional apparatus 108 comprises a diverter device, one or more gates of the additional apparatus 108 may be computer numerically controlled to effectuate diversion of the bulk solid to a secondary flow path separate from the primary flow path and facilitating additional processing and/or disposal of the bulk solid. Conversely, if the answer to the tertiary check at operation 414 is no, the continuous loop 418 is terminated, and the operation of the hopper apparatus 106 is aborted at operation 420 until appropriate measures are taken to address the cause of the unacceptable bulk solid flow rate from the hopper apparatus 106.

Operations 407-416 described above may continue until all portions (e.g., incremental volumes) of the bulk solid(s) have been characterized and flowed through the hopper apparatus 106. Thereafter, the process 400 may continue to operation 422 and the process 400 may end (e.g., be terminated) until such time it is desired to operate the bulk solids processing system 100 again and the process 400 may be restarted (e.g., reinitialized) at operation 402.

The apparatuses, systems, and methods according to embodiments of the disclosure advantageously facilitate the continuous, uniform flow and real time flowability characterization of one or more bulk solids. The bulk solids processing system 100 of the disclosure, including the various components thereof (e.g., the hopper apparatus 106, the main computer/electronics assembly 102, etc.), provides a fast and flexible means of continuously evaluating the flowability of one or more bulk solid(s), and of adjusting processing parameters (e.g., discharge opening sizes, wall angles, etc.) to maintain desired throughput while accounting for the flowability characteristics of the bulk solid(s). The apparatuses, systems, and methods of the disclosure may readily identify and quickly adjust to changes in the rheological properties of one or more bulk solid(s), reducing costs (e.g., process downtime costs, process equipment cleaning and/or repair costs, etc.) and risks (e.g., product deterioration risks, process equipment damage risks, etc.) as compared to conventional apparatuses, conventional systems, and conventional methods for processing one or more bulk solid(s).

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents. For example, elements and features disclosed in relation to one embodiment may be combined with elements and features disclosed in relation to other embodiments of the disclosure.

What is claimed is:

1. A hopper apparatus, comprising:
   a movable wall assembly comprising:
      opposing walls movably connected to a support assembly and oriented at acute angles relative to a central vertical axis of the support assembly; and
      movement control devices configured and positioned to move the opposing walls along the support assembly to control dimensions of a discharge outlet at least partially defined by converging ends of the opposing walls;
   a liner assembly comprising liner structures at least partially overlying inner surfaces of the opposing walls and configured to remain at least partially stationary relative to the opposing walls during movement of the opposing walls; and
   pressure sensors between the inner surfaces of the opposing walls and portions of the liner structures thereover.

2. The hopper apparatus of claim 1, wherein the opposing walls of the movable wall assembly are slidably mounted to opposing structures of the support assembly oriented at the acute angles.

3. The hopper apparatus of claim 2, wherein the movement control devices of the movable wall assembly are configured and positioned to reversibly move the opposing walls of the movable wall assembly along the opposing structures of the support assembly.

4. The hopper apparatus of claim 1, wherein the opposing walls of the movable wall assembly are each independently oriented at an angle within a range of from about 10 degrees to about 45 degrees relative to the central vertical axis of the support assembly.

5. The hopper apparatus of claim 1, wherein the movable wall assembly further comprises wheel assemblies connected to the converging ends of the opposing walls.

6. The hopper apparatus of claim 1, wherein the liner structures of the liner assembly wrap around the converging ends of the opposing walls of the movable wall assembly.

7. The hopper apparatus of claim 1, wherein the liner structures comprise metal alloy sheets.

8. The hopper apparatus of claim 1, wherein the liner assembly further includes actuator devices configured and positioned to maintain the liner structures in a substantially taut state around the opposing walls of the movable wall assembly during movement of the opposing walls.

9. The hopper apparatus of claim 1, wherein the pressure sensors are configured and positioned to measure compression pressure proximate the converging ends of the opposing walls.

10. The hopper apparatus of claim 1, wherein the pressure sensors are configured and positioned to detect a bulk solid fill level within the hopper apparatus.

11. A bulk solids processing system, comprising:
    a source of at least one bulk solid;
    a hopper apparatus configured and positioned to receive the at least one bulk solid from the source and comprising:
       a movable wall assembly comprising:
          opposing walls movably connected to a support assembly and oriented at acute angles relative to a central vertical axis of the support assembly; and
          movement control devices configured and positioned to move the opposing walls along the support assembly to control dimensions of a discharge outlet at least partially defined by converging ends of the opposing walls;
       a liner assembly comprising liner structures at least partially overlying inner surfaces of the opposing walls and configured to remain at least partially stationary relative to the opposing walls during movement of the opposing walls; and
       pressure sensors between the inner surfaces of opposing walls and portions of the liner structures thereover;
    a computer assembly operatively associated with and configured to receive measurement data from the hopper apparatus; and
    control logic in communication with the computer assembly and configured to verify the operability of and control the hopper apparatus and to characterize the flowability of the at least one bulk solid at least partially based on the measurement data received by the computer assembly.

12. The bulk solids processing system of claim 11, wherein the source of at least one bulk solid comprises one or more of a screw conveyor, a drag conveyor, and a vacuum conveyor.

13. The bulk solids processing system of claim 11, wherein the control logic is configured to operate the hopper apparatus in a plurality of modes of operation.

14. The bulk solids processing system of claim 13, wherein the plurality of modes of operation comprise:
    a first mode of operation configured to characterize the flowability of a stationary volume of the at least one bulk solid from within the hopper apparatus and to adjust positions of the opposing walls of the movable wall assembly to facilitate flow of the at least one bulk solid from the hopper apparatus; and
    a second mode of operation configured to characterize the flowability of a mobile volume of the at least one bulk solid the hopper apparatus and to adjust positions of the opposing walls of the movable wall assembly to facilitate substantially continuous, uniform flow of the at least one bulk solid from the hopper apparatus.

15. The bulk solids processing system of claim 14, wherein the first mode of operation is configured to determine rheological properties of the at least one bulk solid at least partially based on pressure measurements from the pressure sensors and on a minimum width of the discharge outlet of the hopper apparatus facilitating flow of the at least one bulk solid from the hopper apparatus.

16. The bulk solids processing system of claim 14, wherein the second mode of operation is configured to determine rheological properties of the at least one bulk solid at least partially based on pressure measurements from the pressure sensors and on changes to a width of the discharge outlet of the hopper apparatus during the substantially continuous, uniform flow of the at least one bulk solid from the hopper apparatus.

17. The bulk solids processing system of claim 14, wherein the second mode of operation is configured to adjust positions of the opposing walls of the movable wall assembly at least partially based on a fill level of the at least one bulk solid within the hopper apparatus.

18. A method of processing a bulk solid, comprising:
determining flowability characteristics of at least one bulk solid using a bulk solids processing system, the bulk solids processing system comprising:
a hopper apparatus operatively associated with a bulk solid source and comprising:
a movable wall assembly comprising:
opposing walls movably connected to a support assembly and oriented at acute angles relative to a central vertical axis of the support assembly; and
movement control devices configured and positioned to move the opposing walls along the support assembly to control dimensions of a discharge outlet at least partially defined by converging ends of the opposing walls;
a liner assembly comprising liner structures at least partially overlying inner surfaces of the opposing walls and configured to remain at least partially stationary relative to the opposing walls during movement of the opposing walls; and
pressure sensors between the inner surfaces of the opposing walls and portions of the liner structures thereover;
a computer assembly operatively associated with and configured to receive measurement data from the hopper apparatus; and
control logic in communication with the computer assembly and configured to verify the operability of and control the hopper apparatus and to characterize the flowability of the at least one bulk solid at least partially based on the measurement data received by the computer assembly; and
controlling, using the control logic in combination with the computer assembly, a flow rate of the at least one bulk solid from the hopper apparatus at least partially based on flowability characteristics of the at least one bulk solid as determined by the computer assembly at least in part responsive to output from the pressure sensors.

19. The method of claim 18, wherein determining flowability characteristics of at least one bulk solid using a bulk solids processing system comprises:
delivering at least one bulk solid into the hopper apparatus;
measuring pressures applied to the hopper apparatus by the at least one bulk solid using the pressure sensors to determine a pressure distribution for the at least one bulk solid within the hopper apparatus; and
determining rheological properties of the at least one bulk solid at least partially based on the determined pressure distribution.

20. The method of claim 19, wherein measuring pressures applied to the hopper apparatus by the at least one bulk solid comprises measuring the pressures applied to hopper apparatus while the at least one bulk solid is in a substantially stationary state within the hopper apparatus.

21. The method of claim 20, further comprising:
measuring a minimum width of the discharge outlet effectuating flow of the at least one bulk solid from the hopper apparatus to determine a critical arching width of the at least one bulk solid; and
determining additional rheological properties of the at least one bulk solid at least partially based on the critical arching width of the at least one bulk solid.

22. The method of claim 19, wherein measuring pressures applied to the hopper apparatus by the at least one bulk solid comprises continuously measuring the pressures applied to the hopper apparatus while the at least one bulk solid is in a substantially mobile state within the hopper apparatus.

23. The method of claim 22, further comprising:
continuously measuring widths of the discharge outlet effectuating substantially continuous flow of the at least one bulk solid from the hopper apparatus at a predetermined flow rate; and
determining additional rheological properties of the at least one bulk solid at least partially based on the continuously measured widths of the discharge outlet.

24. The method of claim 18, wherein controlling a flow rate of the at least one bulk solid from the hopper apparatus comprises:
continuously monitoring a fill level of the at least one bulk solid within the hopper apparatus to determine if the flow rate of the at least one bulk solid from the hopper apparatus is within predetermined flow rate boundaries; and
automatically adjusting positions of the opposing walls of the movable wall assembly if the flow rate of the at least one bulk solid from the hopper apparatus is outside of the predetermined flow rate boundaries to modify dimensions of the discharge outlet of the hopper apparatus until the flow rate of the at least one bulk solid from the hopper apparatus is within the predetermined flow rate boundaries.

25. The method of claim 24, wherein continuously monitoring a fill level of the at least one bulk solid within the hopper apparatus comprises monitoring the fill level of the at least one bulk solid within the hopper apparatus using at least a portion of the pressure sensors.

* * * * *

UNITED STATES PATENT AND TRADEMARK OFFICE
CERTIFICATE OF CORRECTION

PATENT NO. : 9,969,553 B2
APPLICATION NO. : 15/235895
DATED : May 15, 2018
INVENTOR(S) : Tyler Lott Westover et al.

Page 1 of 1

It is certified that error appears in the above-identified patent and that said Letters Patent is hereby corrected as shown below:

In the Specification

Column 1, Line 9, change "DE-AC07-051D14517 awarded" to --DE-AC07-05ID14517 awarded--

Signed and Sealed this
Third Day of July, 2018

Andrei Iancu
*Director of the United States Patent and Trademark Office*